Nov. 13, 1951   R. WARD   2,574,853

STABILIZED AIRCRAFT ANTENNA

Filed Oct. 12, 1945

INVENTOR.
ROGER WARD
BY
Donald W. Farrington
ATTORNEY

Patented Nov. 13, 1951

2,574,853

UNITED STATES PATENT OFFICE 2,574,853

STABILIZED AIRCRAFT ANTENNA

Roger Ward, Upper Falls, Md., assignor to The Glenn L. Martin Company, Middle River, Md., a corporation of Maryland Application October 12, 1945, Serial No. 622,005

5 Claims. (Cl. 244—77)

This invention relates to a safety device, more particularly an automatic control for airplane flight controls to prevent the airplane from flying into obstructions.

One of the greatest hazards to an airplane in flight are weather conditions that prevent visible observation of the terrain to aid the pilot in so flying the airplane as to avoid sudden and unknown obstructions such as mountain ridges and peaks. While instrument flying has been developed to a high degree, there are still sufficient uncorrected variables that cause airplanes flying with or without instruments to crash or fly into obstructions. By the development of the radio absolute altimeter, considerable guess work is taken out of altitude measurements. The altimeter consists of apparatus for sending ultra shortwave radiation downwardly from the aircraft and receiving the reflected wave from a point directly below the aircraft. By measuring the elapsed time of travel, an absolute measurement of the airplane above the ground directly below is obtained.

The principle of the absolute altimeter was applied in Patent 2,225,046 to P. B. Hunter, issued December 17, 1940, to effect a radio contourmeter. In this patent, high frequency radio waves were directed forwardly of the aircraft at a fixed angle to a downwardly directed wave. The two waves separately measured altitude and the distance in front of the aircraft in a predetermined fixed angle. The distances so measured were transformed into visual indications on a scale on the instrument panel. The pilot could continuously observe the variation in the absolute altitude and the variation of the distance along the forwardly directed beam and adjust the controls of the airplane in accordance with the observations of these scales. The difficulty of such a system arises from the fact that the system fails to take into consideration several factors. One, that the attitude of the airplane cannot be depended upon to remain so fixed while the plane is in flight that the indications on the scale will give true and dependable indications of the two measurements of the distances that the radio waves are measuring. If the attitude of the airplane varies, the angle of the downwardly directed beam will vary and the indicator on the scale measuring absolute altitude will fluctuate considerably and with pitching of the aircraft the indicator on the scale showing the distance measured by the forwardly directed radio beam will have tremendous fluctuation and be very unreliable as a contourmeter. The latter fluctuation and the wrong indication resulting therefrom is more serious. Furthermore when the airplane is pitching and the pilot is maneuvering the ship, as for example in a storm, to keep the airplane on as near level flight as possible, it is not safe to trust the pilot to observe the confusion of the indicators registered on the scales and to depend upon him to react and make the necessary control adjustments of the aircraft to avoid a possible obstruction.

The device described in the above mentioned patent could only be useful under conditions which seldom exist, that is, when the airplane is maintained on a straight smooth, constant attitude flight. When the airplane is flying over hilly or mountainous regions during periods of poor visibility, the airplane is most apt to be subject to air currents which cause a very bumpy flight.

The principal object of the present invention is to measure the altitude of the airplane and the distance of the ground from a predetermined point ahead of the aircraft by radio waves which emanate from and are received by antennae on the aircraft so mounted that the antennae are positioned in space independent of the attitude of the airplane in flight. The distance ahead of the airplane being measured on the forwardly directed angle of the radio beam is in proportion to the characteristics of the airplane, namely, the cruising speed and the rate of climb.

It is a further object of this invention to provide a means for adjusting the forwardly directed beam angle to take into consideration the normal cruising speed of the airplane and the rate of climb of the particular airplane.

It is a further object of this invention to take the safety of the aircraft out of the hands of the pilot when the ship is flying under automatic control by having the response to the comparison of the forwardly directed beam and the downwardly directed beam override the automatic control and cause the airplane to start to climb sufficiently ahead of the obstruction to safely clear it.

Further and other objects will become apparent from the description of the accompanying drawings which form a part of this disclosure and in which like numerals refer to like parts.

Figure 1:
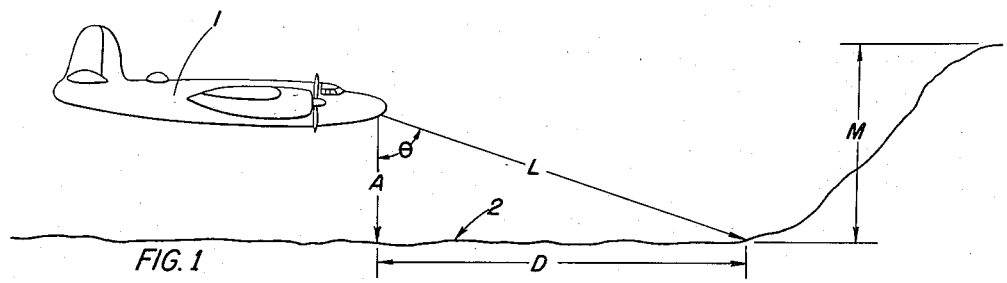
Figure 1 shows a diagrammatic view of the airplane embodying this invention.

The airplane shown as 1 in Figure 1 is shown in flight above the terrain indicated by the line 2. The airplane has mounted in the forward portion of the fuselage an antenna system that sends and receives an ultra shortwave beam vertically downwardly along the path indicated as A. It also has another antenna system for sending and receiving a radio beam along the path indicated as L which is set at an angle θ with respect to the first mentioned beam A. If the terrain should suddenly rise as a hill or mountain indicated as M in Figure 1, the dimension L measured by the forwardly directed beam would suddenly shorten, and this shortening would indicate a rise of ground ahead of the airplane. If means are not provided to detect such a rise of ground at a distance sufficiently ahead of the airplane to enable the airplane to gain such altitude to clear the obstruction, the information would be valueless.

By this invention, the distance L is measured from the airplane to a point ahead of the airplane on the ground by adjusting the beam along path L by varying angle θ. Every airplane has a particular cruising speed and is designed for a maximum rate of climb. If an obstruction should loom up ahead of an airplane, a detecting device must be such that the obstruction is noted in sufficient time that the airplane will have time to gain sufficient altitude at its maximum rate of climb to clear the obstruction. Therefore, the distance ahead of the airplane at which the forwardly directed beam is pointed should be determined by the probable height of the obstruction that the airplane might encounter in a particular flight. When the characteristics of the airplane are known and the probable maxima of the variables that will be encountered in the flight are determined, by simple trigonometry the angle between the vertical beam measuring altitude and the forwardly directed beam measuring the distance to a point ahead of the airplane can easily be determined.

Figure 2:
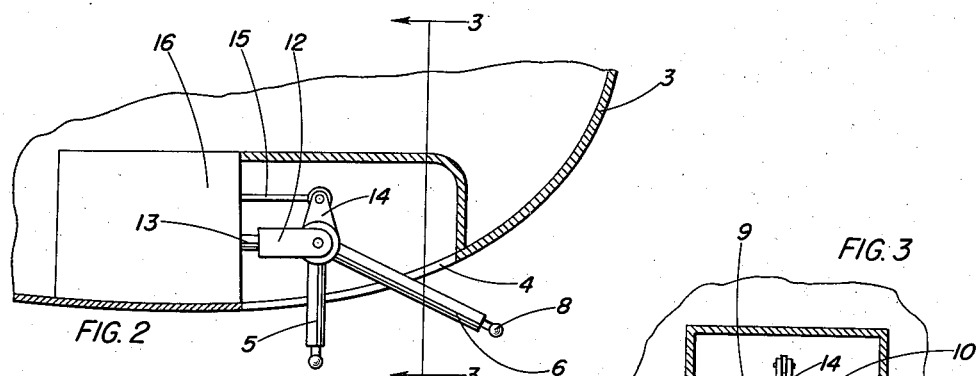
Figure 2 is a fragmentary section through the fuselage showing the antenna.
Figure 3:
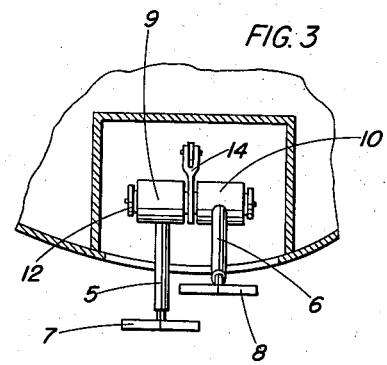
Figure 3 is a section taken on the line 3—3 of Figure 2.

Since it is well known that an airplane over hilly country is subject to considerable pitching and rolling, it is desirable to mount the antenna system for this invention in a manner shown in Figures 2 and 3. The skin of the fuselage is formed with aperture 4 through which extend antennae 5 and 6. Antenna 5 has an end portion 7 for sending and receiving radio waves vertically downwardly to measure the distance to the ground. Antenna 6 has portion 8 to measure the distance by means of a radio wave to a point ahead of the airplane. Antennae 5 and 6 extend from hubs 9 and 10 which are mounted on shafts 11 supported by yoke 12. Antennae 5 and 6 may be adjusted to form any desired angle of one relative to the other, but this angular position after adjustment is fixed and the antennae 5 and 6 move about shaft 11 in yoke 12 together. Yoke 12 is supported by shaft 13. Lever 14 is mounted to move with hubs 9 and 10 so that motion of lever 14 causes the antenna assembly of members 5, 6, 9 and 10 to move as a unit. Linkage 15 and shaft 13 are driven by a gyro stabilizer housed in box 16. Any conventional gyroscopic stabilizer can be used to thus swing the antenna unit about the axes 13 and 11. For example, a gyroscope as in Protzen 2,162,862 could be employed with shaft 13 of the antenna mount connected directly to shaft 31 of the Protzen gyroscope and link 15 pivoted directly to bracket 35 of the gyroscope. Many other equivalent arrangements will be obvious to any one versed in the uses of gyroscopes. By turning shaft 13 about its axis and by pushing and pulling linkage 15, the gyro stabilizer can maintain the antenna assembly in any predetermined position in space independent of the motion of the aircraft. It can readily be seen then that if the airplane is climbing or pitching the radio beam from antenna 5 will accurately measure the altitude of the airplane and in a like manner the radio beam from antenna 6 will accurately measure the distance to a predetermined point ahead of the airplane on the ground.

Figure 4:
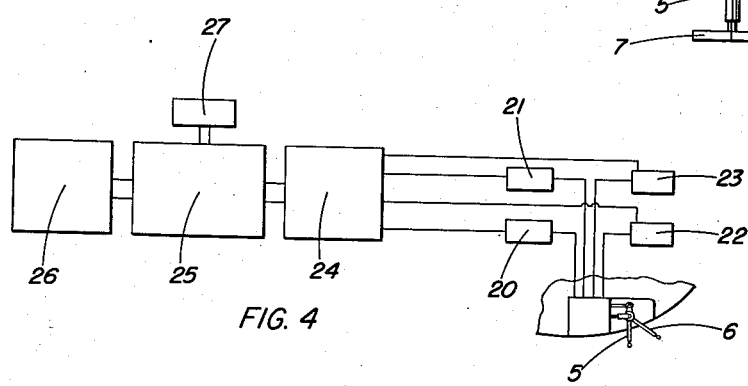
Figure 4 is a diagrammatic arrangement of the controls.

As shown in Figure 4, the stabilized antennae 5 and 6 are connected in a system including a radio transmitter 20 and receiver 21 which are connected to antenna 5 to measure the altitude, and transmitter 22 and receiver 23 are connected to antenna 6 to measure the distance indicated as L in Figure 1. As can be readily seen from Figure 1, for any angle θ between the paths A and L, the distance L, when the plane is over level ground, will equal the square root of $A^2 + D^2$ and the ratio of A to L will therefore be equal to the cosine of θ. If the terrain is rising ahead, this ratio of A to L will be greater than cosine θ, while if the terrain is falling, the ratio will be less than cosine θ. The computer is so designed that whenever this ratio is greater than cosine θ, indicating a rise in terrain ahead, the computer sends a signal into control 25 which causes adjustments in the automatic pilot 26 to cause the plane to climb until the ratio again falls to the predetermined value. The signals received from the antennae 5 and 6 can be said to be combined in the computer 24 so that the climb of the airplane will respond to the distance L expressed as a function divided by cosine θ. As long as the terrain is level, and L is equal to A divided by cosine θ, the computer will not give the signal and the controls are unaffected. The same is true when L is greater than the ratio of A to cosine θ which indicates a downward slope of the terrain. When L becomes less than A divided by cosine θ, indicating an upward slope of the terrain, the controls are actuated to cause the airplane to rise.

The specific details of the receivers, computer and auto-pilot control unit form no part of the present invention, devices which will perform the above-described functions being well-known in the electronics art. As an example, however, the receiving units might include a pair of distance measuring circuits of the type shown by the Higgins et al. Patent 2,206,896 wherein an output voltage is produced which is directly proportional to the length of the path being measured, and with the output voltages of the two units being applied to the computer. The computer itself might be any suitable dividing network such as is shown in the Scherbatskoy et al. Patent 2,129,880, wherein the meter 29 is arranged to directly indicate the ratio between two voltages applied to the input terminals thereof. Obviously a suitable electric switch could be arranged to be automatically closed whenever the ratio (as indicated by the position of the meter pointer) exceeded the certain predetermined value (cosine θ), said switch thereby completing a circuit in an auto-pilot control unit of the type shown by the Boykow Patent 1,869,840 for example, to cause the plane to climb until the ratio again falls to the desired predetermined value. In Boykow, for example, this could be done by connecting the switch so as to shunt from point 43 to 52. Many other equivalent arrangements for producing these results will be obvious to any person skilled in the art.

If the airplane is being flown by the pilot, the control gives an audible or visible signal through member 27 to warn the pilot of the danger ahead.

From the above description it will be apparent that the operation of this invention for any airplane will be dependent upon the characteristics of the airplane. From knowledge of the potential hazards on the ground along the flight path, the maximum obstruction can be estimated. The cruising speed of the airplane and its rate of climb will be known. Therefore, the angle between antennae 5 and 6 can be computed and the antennae adjusted. After the airplane has taken off and its flight altitude attained, it is usual to fly the plane by the automatic pilot. The stabilized antenna described above will continuously measure the altitude and the distance to a point ahead of the airplane and make the necessary adjustments through the computer and control in the automatic pilot to cause the airplane to climb over any obstruction. The safety of the airplane is assured by the fact that the antenna stabilizing mechanism maintains the measuring equipment in a fixed position in space independent of the attitude of the airplane so that false readings or signals will not be caused due to pitching of the airplane in normal flight.

It is to be understood that certain changes, alterations, modifications and substitutions can be made without departing from the spirit and scope of the appended claims.

I claim as my invention:

1. A safety device for an aircraft comprising an antenna support mounted on said aircraft for rotation relative thereto about a first pivot axis parallel to the plane defined by the pitch and roll axes of said aircraft, a pair of directional antennas carried by said support for conjoint rotation relative thereto about a second pivot axis extending substantially perpendicular to said first pivot axis, said antennas being angularly oriented with respect to one another in a plane substantially perpendicular to said second pivot axis whereby a first of said antennas is adapted to transmit and receive radiant energy along a path extending substantially vertically downwardly from said aircraft and said second antenna is adapted to transmit and receive radiant energy along a path extending downwardly and forwardly from said aircraft at a predetermined angle to the vertical, stabilizing means carried by the aircraft for conjointly rotating said antennas about said pivot axes to maintain them in said oriented positions despite pitching or rolling movements of said aircraft, distance measuring means associated with each of said antennas for measuring the distance from said aircraft to the ground along each of said paths, means responsive to said measuring means for comparing said distances, and means responsive to said comparing means for causing said aircraft to climb whenever the ratio of the distance to ground along said vertical path to that along said inclined path exceeds the cosine of the angle between said paths.

2. A safety device for an aircraft comprising an antenna support mounted on said aircraft for rotation relative thereto about a first pivot axis parallel to the plane defined by the pitch and roll axes of said aircraft, a pair of directional antennas carried by said support for conjoint rotation relative thereto about a second pivot axis extending substantially perpendicular to said first pivot axis, said antennas being angularly oriented with respect to one another in a plane substantially perpendicular to said second pivot axis whereby a first of said antennas is adapted to transmit and receive radiant energy along a path extending substantially vertically downwardly from said aircraft and said second antenna is adapted to transmit and receive radiant energy along a path extending downwardly and forwardly from said aircraft at a predetermined angle to the vertical, stabilizing means carried by the aircraft for conjointly rotating said antennas about said pivot axes to maintain them in said oriented positions despite pitching or rolling movements of said aircraft, distance measuring means associated with each of said antennas for measuring the distance from said aircraft to the ground along each of said paths, means responsive to said measuring means for comparing said distances, and means responsive to said comparing means for causing said aircraft to climb whenever the ratio of the distance to ground along said vertical path to that along said inclined path exceeds the cosine of the angle between said paths, said antennas being angularly adjustable relative to one another, whereby the angle between said paths may be varied in accordance with the speed of said aircraft and the nature of the terrain over which said aircraft is to fly.

3. A safety device for an aircraft comprising a member carried by the aircraft for rotation relative thereto about a pivot axis extending substantially parallel to the roll axis thereof, an antenna support carried by said member for rotation about a second pivot axis perpendicular to said first pivot axis, a pair of directional antennas mounted on said support for rotation therewith, one of said antennas being oriented for transmission along a vertical downward path and the other being oriented for transmission along a path extending downwardly and forwardly at a predetermined angle to the vertical, stabilizing means carried by the aircraft for conjointly rotating said antennas about said pivot axes to maintain said antennas in said oriented positions despite roll and pitching movements of said aircraft, means including said antennas for measuring the distances to the ground along said paths, means responsive to said measuring means for comparing said distances, and means responsive to said comparing means for causing said aircraft to climb whenever the ratio of the distance along said vertical path to that along said inclined path exceeds the cosine of the angle between said paths.

4. A safety device for an aircraft comprising a member carried by the aircraft for rotation relative thereto about a pivot axis extending substantially parallel to the roll axis thereof, an antenna support carried by said member for rotation about a second pivot axis perpendicular to said first pivot axis, a pair of directional antennas mounted on said support for rotation therewith, one of said antennas being oriented for transmission along a vertical downward path and the other being oriented for transmission along a path extending downwardly and forwardly at a predetermined angle to the vertical, stabilizing means carried by the aircraft for conjointly rotating said antennas about said pivot axes to maintain said antennas in said oriented positions despite rolling and pitching movements of said aircraft, means including said antennas for measuring the distances to the ground along said paths, means responsive to said measuring means for comparing said distances, and means responsive to said comparing means for causing said aircraft to climb whenever the ratio of the distance along said vertical path to that along said inclined path exceeds the cosine of the angle between said paths, said second antenna being independently angularly adjustable relative to said support whereby the angle between said paths may be varied in accordance with the speed of said aircraft and the nature of the intended flight path.

5. In a safety device for an aircraft, distance measuring means carried by the aircraft and including an antenna support mounted for rotation relative thereto about perpendicularly related axes, and a pair of directional antennas rigidly carried by said support for movement therewith, one of said antennas being oriented so as to transmit and receive radiant energy along a path extending substantially vertically downwardly from said aircraft and the other being oriented so as to transmit and receive radiant energy along an inclined path extending downwardly and forwardly from the aircraft at a predetermined angle to the vertical, said distance measuring means including means for measuring the distance to ground along each of said paths, a comparator responsive to said measuring means for determining the ratio of said distances, means responsive to said comparator for causing said aircraft to climb whenever the ratio of the measured vertical distance to the measured inclined distance exceeds a predetermined value, and stabilizing means carried by said aircraft and operatively connected to said support for rotating said support about said axes to maintain said antennas in said oriented positions despite pitching or rolling movements of the aircraft.

ROGER WARD.

REFERENCES CITED

The following references are of record in the file of this patent:

UNITED STATES PATENTS

| Number | Name | Date |
|---|---|---|
| 1,794,690 | Horni | Mar. 3, 1931 |
| 2,216,575 | Seinfeld et al. | Oct. 1, 1940 |
| 2,225,046 | Hunter | Dec. 17, 1940 |
| 2,288,102 | Meredith | Jan. 30, 1942 |
| 2,314,755 | Warner | Apr. 6, 1943 |
| 2,412,003 | Neufeld | Dec. 3, 1946 |
| 2,417,086 | Proskauer et al. | Mar. 11, 1947 |
| 2,426,658 | Wooldridge | Sept. 2, 1947 |
| 2,499,349 | Ayres | Mar. 7, 1950 |